Aug. 23, 1938.  L. G. HILKEMEIER  2,127,663
VALVE ARM CONSTRUCTION
Filed July 7, 1937
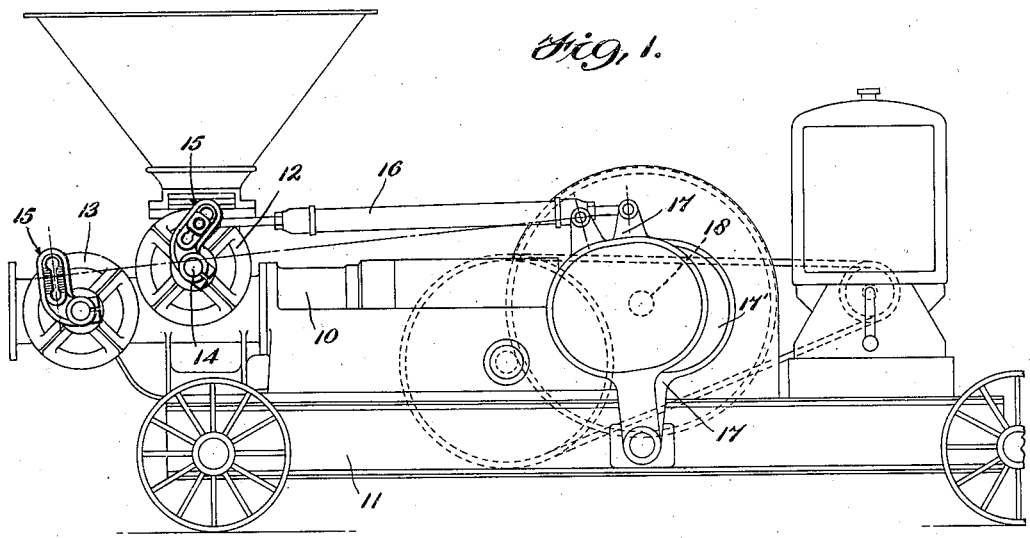
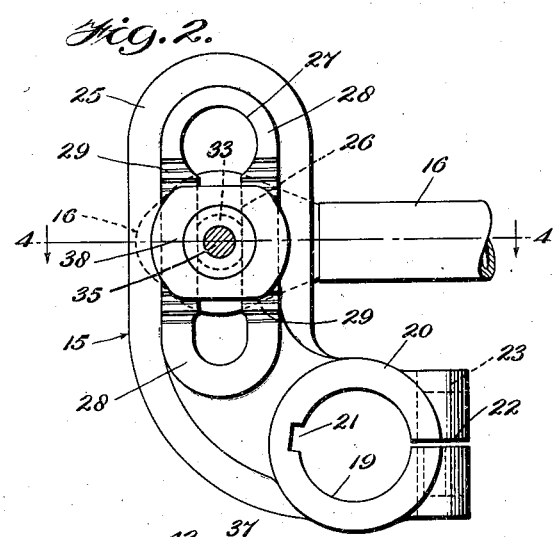
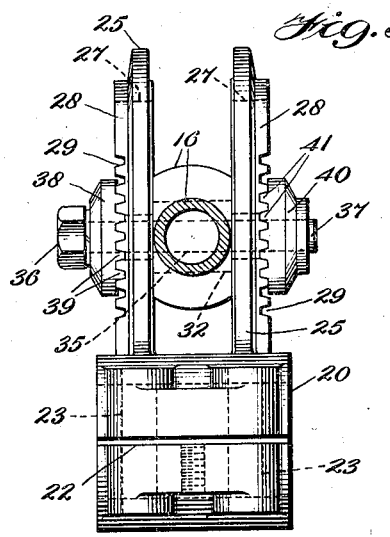
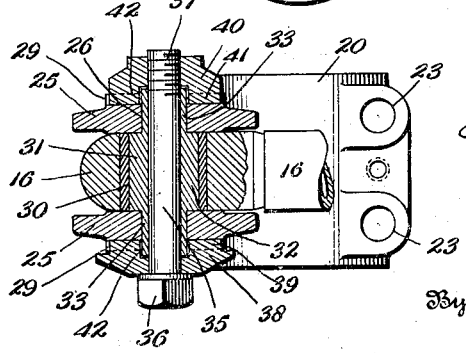
Inventor
Louis G. Hilkemeier,
By Barker & Collings
Attorneys Patented Aug. 23, 1938

2,127,663

UNITED STATES PATENT OFFICE 2,127,663

VALVE ARM CONSTRUCTION

Louis G. Hilkemeier, Milwaukee, Wis., assignor to Chain Belt Company, Milwaukee, Wis., a corporation of Wisconsin Application July 7, 1937, Serial No. 152,423

4 Claims. (Cl. 74—600)

The invention relates to valve arm constructions and has for its principal object to provide an improved valve arm for concrete pumps of the type generically disclosed in the prior U. S. Patent No. 2,017,975, granted October 22, 1935, to Jacobus C. Kooyman.

As is fully disclosed in said Kooyman patent, these pumps employ inlet and outlet valves of the oscillating plug type which are moved from one position to another by means of cam-actuated rock levers which are connected by valve actuating rods to arms rigidly mounted upon the valve shafts. As is likewise disclosed in said Kooyman patent, it is desirable in order to vary the travel or throw of the valve plugs, and thereby accommodate the pump to plastic mixtures containing different types and/or sizes of aggregate that the pivotal connection between the actuating rod and the valve arm be capable of adjustment toward and from the axis of the valve shaft. In other words, since the throw of the cam actuated rock levers is constant, if the location of the pivotal connection between the connecting rods and the valve arms be moved inwardly or outwardly relative to the axis of the valve shafts, the throw of the valves may be correspondingly decreased or increased according to the type of aggregate in the mixture being pumped.

The present invention has for its principal object to provide a construction whereby this change in the location of the pivotal connection between the valve arm and connecting rod relative to the axis of the valve shaft may be readily effected with a minimum of trouble and delay.

With the above and other objects in view which will appear as the description proceeds, the invention consists in the novel details of construction and combinations of parts more fully hereinafter described and particularly pointed out in the appended claims.

Referring to the accompanying drawing forming part of this specification, in which like reference characters designate like parts in all the views—

Figure 1 is a diagrammatic side elevational view of a concrete pump of the Kooyman type showing valve arms constructed in accordance with the present invention applied to the inlet and outlet valves thereof;

Fig. 2 is an enlarged side elevational view of one of the arms together with a portion of the actuating rod therefor;

Fig. 3 is an elevational view of the parts shown in Fig. 2 as seen from the right of said figure, and Fig. 4 is a horizontal sectional plan view taken approximately on the plane indicated by the line 4—4 of Fig. 2, looking down.

In the said drawing, the pump comprises a working cylinder 10 mounted upon a suitable frame or chassis 11 and having associated with it an inlet valve 12 and an outlet valve 13. Since the said valves are or may be identical in construction, the following disclosure will be confined to the valve 12.

The said valve is provided with a valve shaft 14 to one end of which is rigidly secured a valve arm 15 which is arranged to be oscillated by means of an actuating rod 16 extending from the arm 15 to a rock lever 17 which is adapted to be oscillated by means of suitable cams contained within a housing 17′ and mounted upon the crank shaft 18 of the pump, all as is fully disclosed in said Kooyman patent.

The valve arm construction constituting the present invention embodies a hub 20 which may be provided with a bore 19 having suitable keyway 21 for cooperation with a key carried by the valve shaft 14, and the said hub may further be split as at 22 and provided with apertures 23 for the reception of bolts, not shown, by means of which it may be rigidly clamped upon said valve shaft. Integral with the hub 20 is a pair of alined laterally spaced arms 25 which, as here shown, are curved to offset them from the axis of hub 20, although if desired they may extend radially from the said hub. The said arms are each provided with longitudinally extending slots 26 which terminate at one end in the enlarged apertures 27 for a purpose which will appear more fully below. The outer face of each arm is provided with a pad 28 having a plurality of transversely extending serrations 29 disposed along the slots 26 as will be readily understood from Figures 2 and 3.

The actuating rod 16 is provided with an eye 30 journalled upon the body portion 31 of a tubular sleeve 32 which is positioned between the arms 25. The said sleeve 32 has the flatted end portions 33 which are slidably received in the opposed slots 26, see Fig. 4. A pin or bolt 35 35 having a head 36 on one end is passed through the bore of sleeve 32 and has its opposite end threaded as at 37. A washer member 38 is mounted upon the pin 35 adjacent its head and is provided with teeth or serrations 39 adapted to engage with the serrations 29 of the companion arm 25. A nut 40 is threaded upon the other end of the pin 35 and it likewise is provided with teeth or serrations 41 arranged to engage and co-act with the serrations 29 of the other arm 25.

The body portion 31 of sleeve 32 which constitutes a bearing member for the eye of actuating rod 16 is of a diameter greater than the width of the slots 26 but of such dimensions that it may be passed through the enlarged apertures 27 in the arms whereby it may be introduced to a position between the arms whereupon its reduced end portions 33 may be slidably received in the said slots. In this manner the parts may be assembled, it being understood of course that the eye 30 of the actuating rod 16 is first alined with the apertures 27 whereupon the sleeve may be introduced through one of said apertures until its body portion is alined with the eye whereupon the parts may be dropped into the slots 26.

The position of the axis of pin 35 relative to the axis of the valve shaft 14 may be determined by engaging the serrations of the washer 38 and nut 40 in the proper serrations of the arms 25, whereupon by inserting the pin or bolt 35 in the sleeve bore and screwing it home in the nut 40 the parts may be effectively locked in this position. It will be noted that both the washer 38 and the nut 40 are recessed as at 42 to accommodate the outer ends of the reduced portions 33 of sleeve 32.

Obviously, change in the position of the pivot pin 35 relative to the axis of valve shaft 14 may be quickly and easily accomplished by backing off on the pin 35 until the serrations of the washer 38 and nut 40 can be disengaged from those of the arms 25, whereupon the actuating rod 16 and sleeve 32 may be moved inwardly or outwardly as the case may be to the new position, whereupon the teeth or serrations of washer 38 and nut 40 are again engaged with those of arms 25 and the pin 35 again screwed home. During this operation the actuating rod 16 cannot become inadvertently disengaged from the valve arm, since the parts can only be disassembled through elevating the rod 16 to bring its eye 30 into alinement with the enlarged apertures 27 so that the sleeve 32 can be moved axially therethrough.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In valve arm construction, a hub arranged to be rigidly secured to a valve shaft, having a plurality of laterally spaced arms extending outwardly therefrom, said arms having complementary longitudinally extending slots therein, and a side face of said arms having transverse serrations along said slots; a pin slidably mounted in said slots and bridging the space between said arms, for pivotally connecting an actuating rod between said arms; serrated means carried by said pin arranged to be variably engaged with the serrations of said arms to determine the position of the pin relative to the axis of the valve shaft; and means for retaining the pin in such determined position.

2. In valve arm construction, a hub arranged to be rigidly secured to a valve shaft, having a plurality of alined laterally spaced arms extending outwardly therefrom, said arms having complementary longitudinally extending slots therein, and the outer faces of said arms having transverse serrations along said slots; a pin slidable in said slots for pivotally mounting an actuating rod between said arms; and oppositely disposed members carried by said pin having serrations arranged to be variably engaged with those on said arms to determine the position of the pin relative to the axis of the valve shaft, one of said members being threaded upon said pin, whereby the parts may be positively retained in a determined position.

3. In valve arm construction, a hub arranged to be rigidly secured to a valve shaft, having a pair of alined laterally spaced arms extending outwardly therefrom, said arms having alined longitudinally extending slots therein, and the outer faces of the arms having transverse serrations along said slots; a sleeve mounted between said arms having reduced end portions slidably received in said slots, said sleeve constituting a bearing member for pivotally mounting an actuating rod between said arms; a headed and threaded pin extending through said sleeve; a washer carried by said pin adjacent its head, having a serrated face arranged to be variably engaged with the serrations on one of said arms; and a nut threaded on the other end of said pin, having a serrated face arranged to be variably engaged with the serrations on the other of said arms.

4. In valve arm construction, a hub arranged to be rigidly secured to a valve shaft, having a pair of alined laterally spaced arms extending outwardly therefrom, said arms having alined longitudinally extending slots therein terminating at one end in enlarged apertures, the outer faces of said arms having transverse serrations along said slots; a sleeve having a body portion of a diameter greater than the width of said slots but passable through said enlarged apertures to a position between said arms to constitute a bearing member for pivotally mounting an actuating rod, said sleeve having reduced end portions slidably received in said slots; a headed pin extending through said sleeve; and serrated means including a nut threaded on said pin, arranged to be variably engaged with the serrations on said arms to determine the position of the pin and sleeve in the slots relative to the axis of the valve shaft.

LOUIS G. HILKEMEIER.